(12) United States Patent
Marschke

(10) Patent No.: US 8,940,168 B2
(45) Date of Patent: Jan. 27, 2015

(54) AXIAL BYPASS SLEEVE

(75) Inventor: Dean David Marschke, Eden Prairie, MN (US)

(73) Assignee: General Electric Company, Schenectady, NY (US)

( * ) Notice: Subject to any disclaimer, the term of this patent is extended or adjusted under 35 U.S.C. 154(b) by 609 days.

(21) Appl. No.: 13/332,464

(22) Filed: Dec. 21, 2011

(65) Prior Publication Data

US 2013/0161257 A1 Jun. 27, 2013

(51) Int. Cl.
*B01D 63/10* (2006.01)
*B32B 1/08* (2006.01)
*B01D 61/00* (2006.01)

(52) U.S. Cl.
USPC ...... 210/321.83; 210/650; 210/456; 428/34.1

(58) Field of Classification Search
CPC . B01D 231/08; B01D 2319/02; B01D 63/103
USPC .............................. 210/321.83, 650; 428/34.1
See application file for complete search history.

(56) References Cited

U.S. PATENT DOCUMENTS

| | | | |
|---|---|---|---|
| 3,314,546 A | 4/1967 | Briggs et al. |
| 4,016,083 A | 4/1977 | Sakaguchi et al. |
| 4,064,052 A | 12/1977 | Zimmerly |
| 4,301,013 A | 11/1981 | Setti et al. |
| 4,548,714 A | 10/1985 | Kirwan, Jr. et al. |
| 4,906,372 A | 3/1990 | Hopkins |
| 5,891,334 A | 4/1999 | Gundrum et al. |
| 5,985,146 A | 11/1999 | Knappe et al. |
| 6,110,368 A | 8/2000 | Hopkins |
| 6,830,683 B2 | 12/2004 | Gundrum et al. |
| 7,063,789 B2 | 6/2006 | Colby et al. |
| 7,306,709 B2 | 12/2007 | Grebenyuk et al. |
| 7,396,463 B2 | 7/2008 | Moller |
| 2008/0185323 A1 | 8/2008 | Kargenian |
| 2009/0200237 A1 | 8/2009 | Weber et al. |
| 2011/0084455 A1 | 4/2011 | Elwell et al. |

FOREIGN PATENT DOCUMENTS

EP 188224 A2 7/1986

OTHER PUBLICATIONS

Search Report and Written Opinion from corresponding PCT Application No. PCT/US2012/066711 dated Feb. 28, 2013.
Magnani, Ron et al., By-Pass Flow in Sanitary Membrane Elements, TriSep Corporation, Goleta, CA.
Hydranautics High Performance Membrane Products, A Nitto Denko Corporation, Commercial RO Technology, Jan. 23, 2001.

*Primary Examiner* — Dirk Bass
(74) *Attorney, Agent, or Firm* — Scott Pundsack; Borden Ladner Gervais LLP

(57) ABSTRACT

The present disclosure describes an axial bypass sleeve for use with a spiral wound membrane element. The axial bypass sleeve has a protrusion and an opening that defines a flow path to provide fluid flow communication through the axial bypass sleeve. In use, the axial bypass sleeve is wrapped around a spiral wound membrane element and both are placed in a pressure housing. A pressurized feedstock is introduced into the pressure housing. A portion of the pressurized feedstock flows through the spiral wound membrane element to produce a permeate stream and a retentate stream. A portion of the pressurized feed stock flows around the spiral wound membrane element, called bypass flow. The protrusion extends into the annular space to restrict the bypass flow. A portion of the bypass flow passes through the opening and enters into the spiral wound membrane element to increase permeate production.

10 Claims, 5 Drawing Sheets

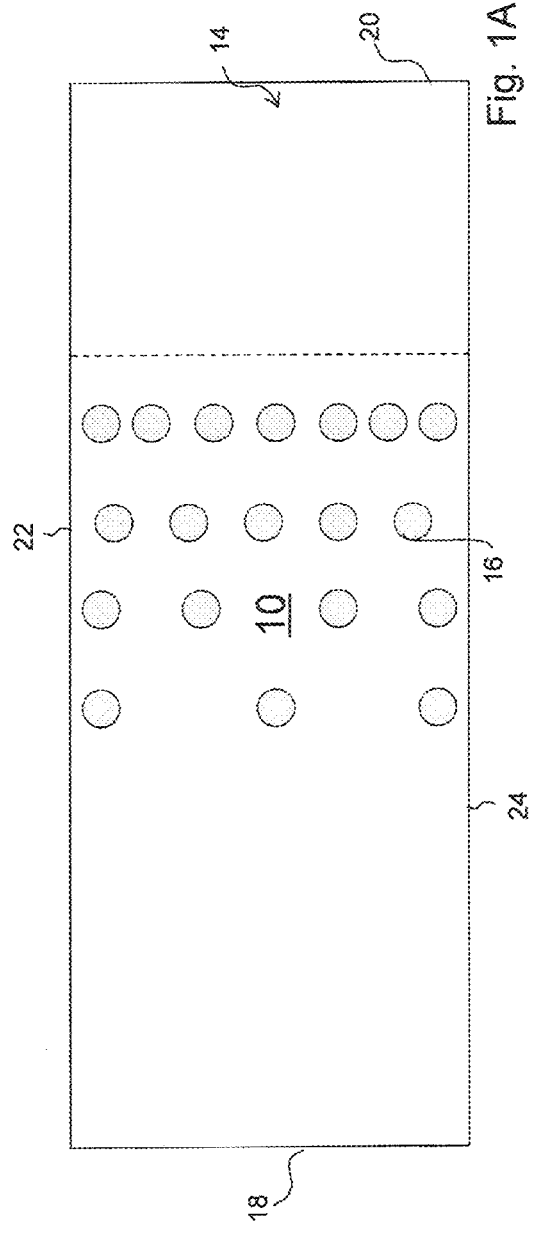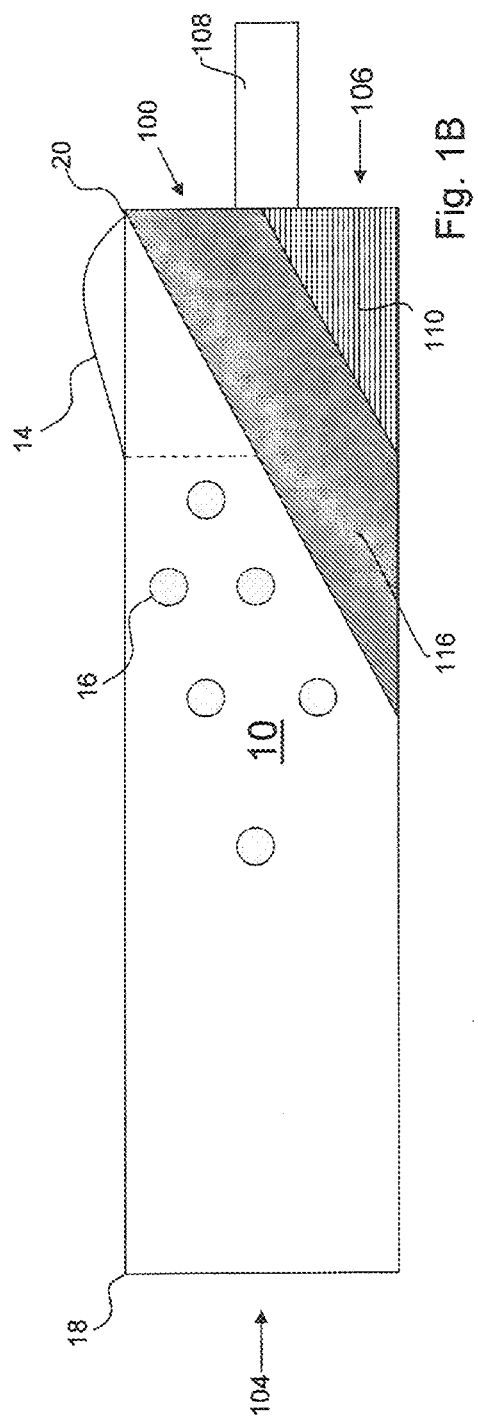

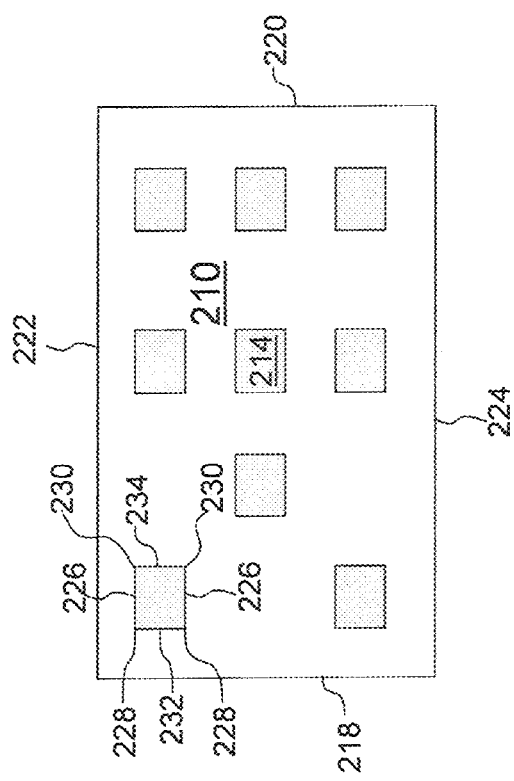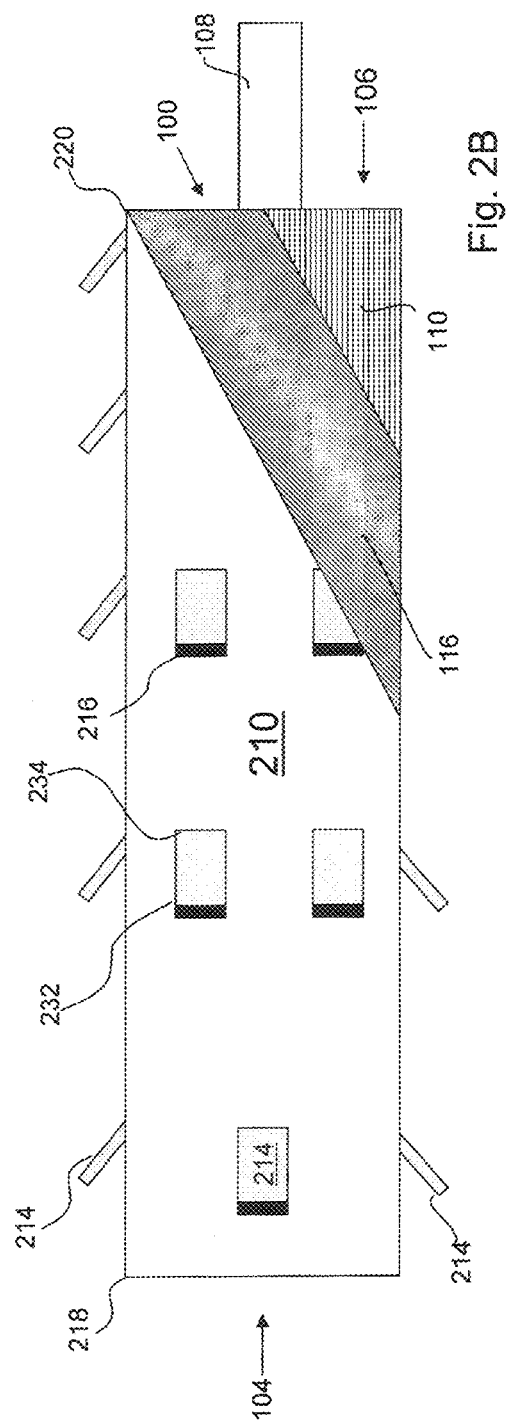

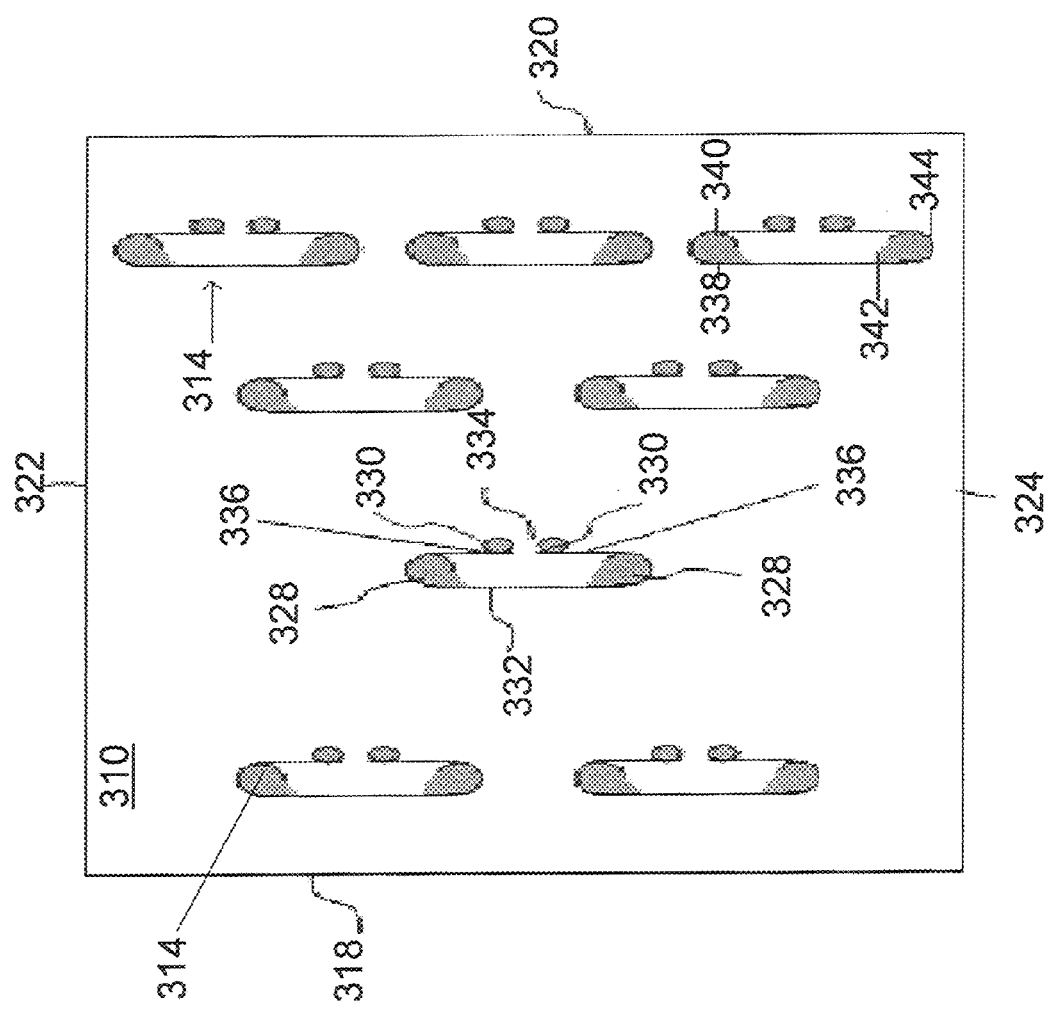

AXIAL BYPASS SLEEVE

The present disclosure relates generally to spiral wound membrane elements.

BACKGROUND

The following discussion is not an admission that anything discussed below is citable as prior art or common general knowledge.

Typically, a spiral wound membrane element is made by wrapping one or more membrane leaves around a perforated central tube. One edge of a feed carrier sheet is placed in a fold of a generally rectangular membrane sheet. The fold of the membrane sheet is positioned along a perforated central tube. A permeate carrier sheet is provided between each pair of membrane sheets. Glue lines seal the permeate carrier sheet between adjacent membrane sheets along three edges, forming a membrane leaf. The fourth edge of the leaf is open to the perforated central tube. All of the sheets are wrapped around the perforated central tube.

In use, the spiral wound membrane element is housed in a pressure housing, also referred to as a pressure tube or a pressure vessel. A pressurized feedstock is delivered at an upstream end of the pressure housing and flows into the spiral wound membrane element. Within the spiral wound membrane element, the pressurized feedstock flows through the feed spacer sheets and across the surface of the membrane sheets. The membrane sheets may have a discriminating layer that is suitably sized for microfiltration, ultrafiltration, reverse osmosis or nanofiltration. A portion of the pressurized feedstock is driven through the discriminating layer by transmembrane pressure to produce a permeate stream. The permeate stream flows along the permeate carrier sheets into the central tube for collection outside the pressure housing. The components of the pressurized feedstock that do not pass through the membrane, also referred to as retentate, continue to move through the feed spacer sheets to be collected at a downstream end of the pressure housing.

Some specific industries (for example the dairy industry) require sanitary spiral wound membrane elements that meet the requirements of the Sanitary 3A Standards for Crossflow Membrane Modules. Sanitary problems can arise in areas of low flow, also referred to as areas of tight tolerance. In areas of tight tolerance, there is limited fluid access and therefore limited flushing to remove solids or provide sanitization solutions. One region that typically has tight tolerance is between an inner surface of the pressure housing and the outer surface of the spiral wound membrane element, referred to as the annular space.

A common solution to low flow in the annular space is to direct a portion of the feedstock flow into the annular space. This is referred to as bypass flow. Bypass flow improves flushing of the annular space; however, the bypass flow also reduces the volume of feedstock that passes through the spiral wound membrane element to contribute to the production of permeate.

Various factors affect permeate production including temperature, osmotic pressure gradients, polarization layer, the charge of materials, fouling and the balance of fluid pressures across the membrane sheets, referred to as transmembrane pressure. The pressure of the feedstock within the feed spacer sheets influences the transmembrane pressure. As the permeate volume increases, the pressure and velocity of the feedstock within the feed spacer sheets decreases. Furthermore, the flow of feedstock through the feed spacer sheets is exposed to resistance, which is a source of head loss. Due to the volume loss of the feedstock and the head loss, the pressure and velocity of the feedstock within the feed spacer sheet decreases along the length of the spiral wound membrane element. This decreased feed spacer sheet pressure decreases the transmembrane pressure and decreases overall permeate production. The decreased velocity reduces disruption of the polarization layer at the membrane surface, which further reduces permeate production.

Typically, more than one spiral wound membrane element is housed in one pressure housing. For example, in the dairy industry between one and ten spiral wound membrane elements can be housed in one pressure housing. The multiple spiral wound membrane elements are connected in series and they typically share a common central tube. A standard dairy feedstock is introduced into the upstream end of the pressure housing at a pressure of about 100 psi. Along the length of a given spiral wound membrane element, the feed spacer sheet pressure may decrease about 5 to 10 psi. This pressure decrease can accumulate when multiple spiral wound membrane elements are used in one pressure housing and decrease the production of permeate within a given pressure housing.

SUMMARY

An axial bypass sleeve for use with spiral wound membrane elements are disclosed in the detailed description below. Part of the axial bypass sleeve protrudes away from the axial bypass sleeve. Another part of the axial bypass sleeve allows fluid communication through the axial bypass sleeve.

The axial bypass sleeve has a top surface and a bottom surface. The axial bypass sleeve can be wrapped around a spiral wound membrane element with the bottom surface in proximity to the spiral wound membrane element. The axial bypass sleeve comprises a protrusion and one or more holes that define a flow path. The protrusion can be integral with the axial bypass controls sleeve or the protrusion can be a second component. The holes allow fluid communication between the top surface and the bottom surface of the axial bypass sleeve.

In operation, the axial bypass sleeve is wrapped around a spiral wound membrane element. The spiral wound membrane element and axial bypass sleeve are placed inside a pressure housing, either alone or in series with other spiral wound membrane elements. Pressurized feedstock is introduced into a feed end of the pressure housing. A portion of the pressurized feedstock will contribute to a pressurized stream of bypass flow through an annular space between the inner surface of the pressure housing and the outer surface of the spiral wound membrane element. The protrusion restricts the bypass flow at a downstream location within the annular space, which modifies the pressure of the bypass flow.

Due to the pressure decrease along the length of the feed spacer sheets, a pressure gradient can develop between the annular space and within the feed spacer sheets. Without being bound by theory, this pressure gradient may cause pressurized feedstock within the bypass flow to flow through the flow path and into the feed spacer sheets of the spiral wound membrane element. This increases the flow rate of the feedstock within the feed spacer sheet. The increased flow rate of feedstock within the feed spacer sheet may contribute to increasing the transmembrane pressure and permeate production may increase along the length of the spiral wound membrane element.

BRIEF DESCRIPTION OF THE DRAWINGS

FIG. 1A is a top-plan view of an axial bypass sleeve.

FIG. 1B is a partial cut-away, side view schematic drawing of an axial bypass sleeve wrapped around a spiral wound membrane element.

FIG. 2A a top-plan view of a second axial bypass sleeve.

FIG. 2B is a partial cut-away, side view schematic drawing of the second axial bypass sleeve wrapped around a spiral wound membrane element.

FIG. 3 is a top-plan view of a third axial bypass sleeve.

DETAILED DESCRIPTION

Figure 4:
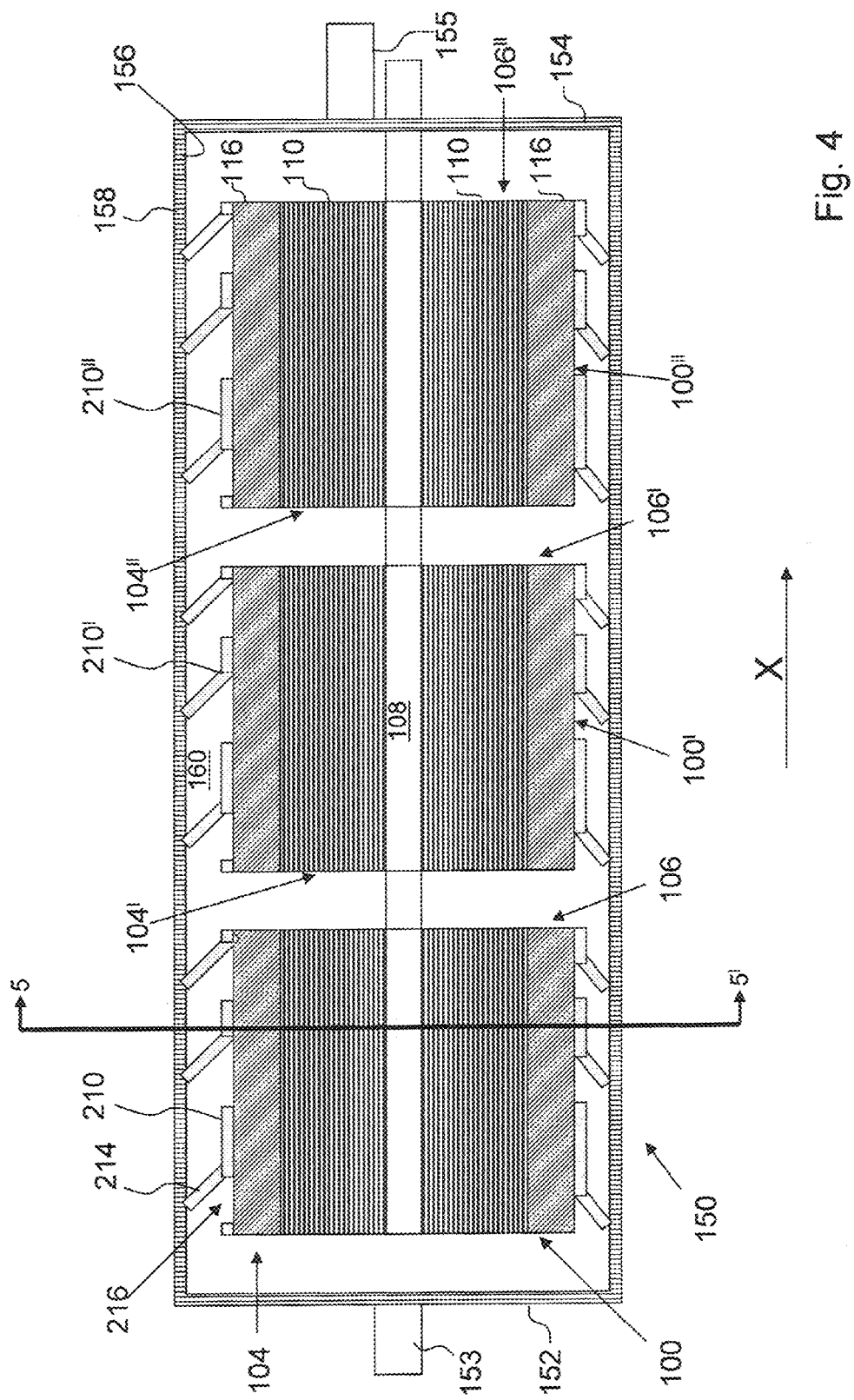
FIG. 4 is a schematic cut away drawing of three spiral wound membrane elements located within a pressure housing, each spiral wound membrane wrapped by the second axial bypass sleeve.

An axial bypass sleeve for use with a spiral wound membrane element is described below. The axial bypass sleeve has a top or outside surface and a bottom or inside surface. A part of the sleeve protrudes away from the top surface of the axial bypass sleeve and another part of the sleeve is open between the top and bottom surfaces. A protrusion can be integral with the axial bypass sleeve. Alternatively, the protrusion can be a separate component that is positioned proximal, upon or below the rest of the axial bypass sleeve.

The FIGS. 1 to 5 depict an axial bypass sleeve for use with spiral wound membrane elements, as further described below. The axial bypass sleeve comprises a protrusion and at least one opening to allow fluid communication through the axial bypass sleeve.

FIG. 1A depicts an axial bypass sleeve 10. The axial bypass sleeve 10 is generally planar and comprises a protrusion 14 and at least one access port 16. As will be described below, the planar axial bypass sleeve 10 can be wrapped around a spiral wound membrane element 100 and can form a cylinder-like body. The axial bypass sleeve 10 has a first edge 18, a second edge 20, a first side 22 and a second side 24. The protrusion 14 is shown as a region that begins at the dotted line in FIG. 1, and ends at, or near, the second edge 20. The access ports 16 are shown as a series of perforations through the axial bypass sleeve 10 and positioned between the first edge 18 and the protrusion 14. The access ports 16 can be any shape or design that permits fluid communication through the axial bypass sleeve 10. Optionally, there can be a greater density of access ports 16 proximal to the protrusion 14.

FIG. 1B shows the axial bypass sleeve 10 wrapped around a spiral wound membrane element 100. The protrusion 14 is shown as a region of gradually increased thickness. A variety of different approaches can be used to increase the thickness of the protrusion 14. For example, during the manufacture of the axial bypass sleeve 10, more materials can be incorporated to form a protrusion 14 that is integral with the axial bypass sleeve 10 with a predetermined thickness. The final thickness of the protrusion 14 can be decreased, if desired, by cutting away material from the protrusion 14 so the protrusion 14 has a desired thickness. Optionally, the protrusion 14 can be added to the axial bypass sleeve 10 after manufacture by one or more additional parts, for example, a ring inserted upon, or below the axial bypass sleeve 10 to form the protrusion 14.

The cut away section of FIG. 1B depicts the spiral wound membrane element 100 underneath the axial bypass sleeve 10. The axial bypass sleeve 10 is wrapped by fixing the first side 22 and the second side 24 together. The first side 22 and the second side 24 can be fixed together by suitable fixation methods that may include, thermal bonding, ultrasonic welding, adhesives and the like. The axial bypass sleeve 10 may be tension wrapped around the spiral membrane element 100 and the fixing of the first side 22 and the second side 24 maintains that tension. The tension wrapping of the axial bypass sleeve 10 may prevent or decrease telescopic unraveling or compression of the spiral wound membrane element 100, as is known to occur under standard operational conditions.

The spiral wound membrane element 100 has an upstream end 104 and a downstream end 106. As will be discussed further below, the upstream end 104 receives the pressurized feedstock. The downstream end 106 is the end of the spiral wound membrane element 100 where a permeate flow (not shown) and a retentate flow (not shown) are collected. The axial bypass sleeve 10 is oriented upon the spiral wound membrane element 100 with the first edge 18 closest to the upstream end 104 and the second edge 20 closest to the downstream end 106.

The spiral wound membrane element 100 wraps around the central tube 108. The spiral wound membrane element 100 comprises a mixed layer 110 of multiple layers of membrane leaves. The mixed layer 110 is formed by wrapping the membrane leaves around the central tube 108 so that each of the membrane sheet, the permeate carrier sheet and the feed spacer sheet have one edge that is close to the central tube 108 and one edge that is distal from the central tube 108. At the periphery of the mixed layer 110, distal to the central tube 108, is an outer layer 116. The outer layer 116 comprises the distal edges of the membrane leaves. In the outer layer 116, the distal edges of the feed spacer sheets extend to and optionally past the distal edges of the membrane sheet and permeate carrier sheet of a membrane leaf. The distal edge of one feed spacer sheet can terminate on the feed spacer sheet of another membrane leaf. In that case, the outer layer 116 comprises feed spacer sheets that cover the distal edges of the membrane sheets and permeate carrier sheets and the feed spacer sheets provide fluid communication with the mixed layer 110 below. The feed spacer sheets prevent the distal edges of one membrane leaf from coming in direct contact with another leaf. Direct contact between the distal edges of different membrane leaves can create unsanitary areas of tight tolerance.

Optionally, the feed spacer sheets do not terminate on other feed spacer sheets, rather each feed spacer sheet terminates before covering the distal edge of a membrane leaf. However, in this case the feed spacer sheets still prevent the distal edges of different membrane leaves from coming in direct contact, while providing fluid communication with the mixed layer 110.

Adjacent the outer layer 116 is the axial bypass sleeve 10. Optionally, a cage (not shown) can be positioned between the outer layer 116 and the axial bypass sleeve 10. The cage can be made of similar materials as the feed spacer sheets, optionally of larger dimensions. The cage can assist in structurally reinforcing the mixed layer 110 and the outer layer 116.

FIG. 2A depicts a second axial bypass sleeve 210. The second axial bypass sleeve 210 is generally planar and comprises a protrusion in the form of tabs 214, and access ports 216 that are associated with each tab 214 (as shown in FIG. 2B). As described further below, the access ports 216 are formed by the cutting of the tabs 214 from the second axial bypass sleeve 210. Optionally, the access ports 216 are holes that are cut through the axial bypass sleeve 210 and the tabs 214 are fixed to the axial bypass sleeve 210.

The second axial bypass sleeve 210 comprises a first edge 218, a second edge 220, a first side 222 and a second side 224.

In FIG. 2, the tabs 214 are shown as generally rectangular in shape but other shapes may also be used.

The tabs 214 can be formed by two cut lines 226 of equal length through the axial bypass sleeve 210. The two cut lines 226 each have a first end 228 and a second end 230. The two cut lines 226 are cut parallel to the first and second sides 222, 224. An upstream cut line 232 is cut perpendicular to the two cut lines 226 and forms provides an edgewise connection, also referred to as the upstream edge, between the two first ends 228. The upstream cut line 232 is parallel to the first and second edges 218, 220 and the upstream cut line 232 is closest to the first edge 218 of the axial bypass sleeve 210. The tabs 214 also have a joined side 234 that is integral with the axial bypass sleeve 210 and opposite and parallel to the third cut line 220. The joined side 234 is closest to the second edge 220. The joined side 234 provides a pivot point that allows the tabs 214 to move to an extended position. Optionally, the joined side 234 may be indented or creased to facilitate pivoting.

For the purposes of this disclosure, in the extended position, the tab 214 is not aligned with the planar surface of the axial bypass sleeve 210 and an upstream edge of the tab 214, formed by the upstream cut line 232, extends away from the planar surface. In the extended position, the tabs 214 open the access ports 216 and allow fluid communication through the access ports 216. The pivotal connection affords the tab 214 a wide range of positions, as indicated by an angle ranging from about 1° to about 180° relative to the planar body of the axial bypass sleeve 210. Optionally, while in the extended position the tab 214 is at an angle ranging from about 1° to about 90°, or from about 1° to about 45°, or from about 1° to about 30°. All of these degree ranges are relative to the planar body of the axial bypass sleeve 210. When the tabs 214 are in the extended position, the associated access ports 216 are open to provide fluid communication across the planar body.

FIG. 2B depicts the second axial bypass sleeve 210 wrapped around a spiral wound membrane element 100. The tabs 214 are shown in the extended position.

FIG. 3 depicts a third axial bypass sleeve 310. The third axial bypass sleeve 310 is very similar to the axial bypass sleeve 210, described above. The third axial bypass sleeve 310 is generally planar and comprises tabs 314 and access ports 316. The third axial bypass sleeve 310 has a first edge 318, a second edge 320, a first side 322 and a second side 324. The tabs 314 are made by a combination of cut lines and holes made through the third axial bypass sleeve 310. Optionally, the access ports 316 are holes that are cut through the axial bypass sleeve 310 and the tabs 314 are fixed to the axial bypass sleeve 310.

The tab 314 has two primary holes 328 cut through the third axial bypass sleeve 310. An upstream cut line 332 connects the two primary holes 328. The primary holes 328 have an upstream side 338 that is closest to the first edge 318 and a downstream side 340 that is closest to the second edge 320. Each primary hole 328 has a first lateral side 342 closest to the first side 322 and a second lateral side 344 closest to the second side 324. The upstream cut line 332 connects the upstream sides 338 of the two primary holes 328. Between the two primary holes 328 and closer to the second edge 320, two secondary holes 330 are cut through the third axial bypass sleeve 310. A secondary cut line 336 joins the downstream side 340 of each primary hole 328 with the secondary holes 330.

Between the two secondary holes 330 is a joined side 334 that provides a pivot point that allows the tabs 314 to move through a range of the extended position. In the extended position, the primary holes 328 and the secondary holes 330 contribute to the access port 316, which provides fluid communication through the planar body of the third axial bypass control sleeve 310.

In comparison to the tabs 214, the tabs 314 generally have a more curvilinear shape with fewer corners, creases and edges, which are a source of tight tolerance. Optionally, a variety of other methods may be used to create a similar curvilinear shape, or other shapes of the tabs 314 that do not act as a source of tight tolerance.

Optionally, the axial bypass sleeves 10, 210, 310 can be cylindrical, such as a heat shrink tube or other forms of deformable sleeves that can be positioned around the spiral wound membrane element 100, as described below.

The axial bypass sleeves 10, 210, 310 can be constructed of a number of suitable materials that preferably meet food contact standards. Examples of suitable materials include polypropylene, low-density polyethylene, high-density polyethylene and porous plastics. Optionally, the axial bypass sleeves 10, 210, 310 can be constructed of metal or alloys, such as 300 series stainless steel. Further, the axial bypass sleeves 10, 210, 310 can also be constructed of metal or alloys that are encapsulated within another suitable material, for example, aluminum encapsulated in polypropylene.

The number of tabs 214, 314 can vary depending upon the size of the axial bypass sleeve 210, 310, which may depend upon the size of the spiral wound membrane element 100 used in a given application. Further, there may be a longitudinal distribution of tabs 214, 314 such that a smaller number, or a greater number, of tabs 214, 314 are positioned towards the first edge 218, 318 in comparison to the second edge 220, 320. Preferably, a greater number of tabs 214, 314 are positioned towards the second edge 220, 320.

FIG. 4 depicts three spiral wound membrane elements 100, $100^1$, $100^{11}$ positioned within a pressure housing 150. The pressure housing 150 has an upstream end 152 with an inlet pipe 153 and a down stream end 154 with an outlet pipe 155. The upstream end 152 and the downstream end 154 define a longitudinal axis of the pressure housing 150, shown as line X in FIG. 4. The pressure housing 150 is tubular in shape with an inner surface 156 and an outer surface 158.

Each spiral wound membrane element 100, $100^1$, $100^{11}$ is shown wrapped by a second axial bypass sleeve 210, $210^1$, $210^{11}$. Any of the axial bypass sleeves 10, 210 and 310 are suitable to be positioned around a spiral wound membrane element 100. The three spiral wound membrane elements 100, $100^1$, $100^{11}$ may be connected in series and share a common central tube 108. Although only three spiral wound membrane elements 100 are shown in FIG. 4, there can be four to eight, or more, spiral wound membrane elements 100 within a given pressure housing 150.

Figure 5:
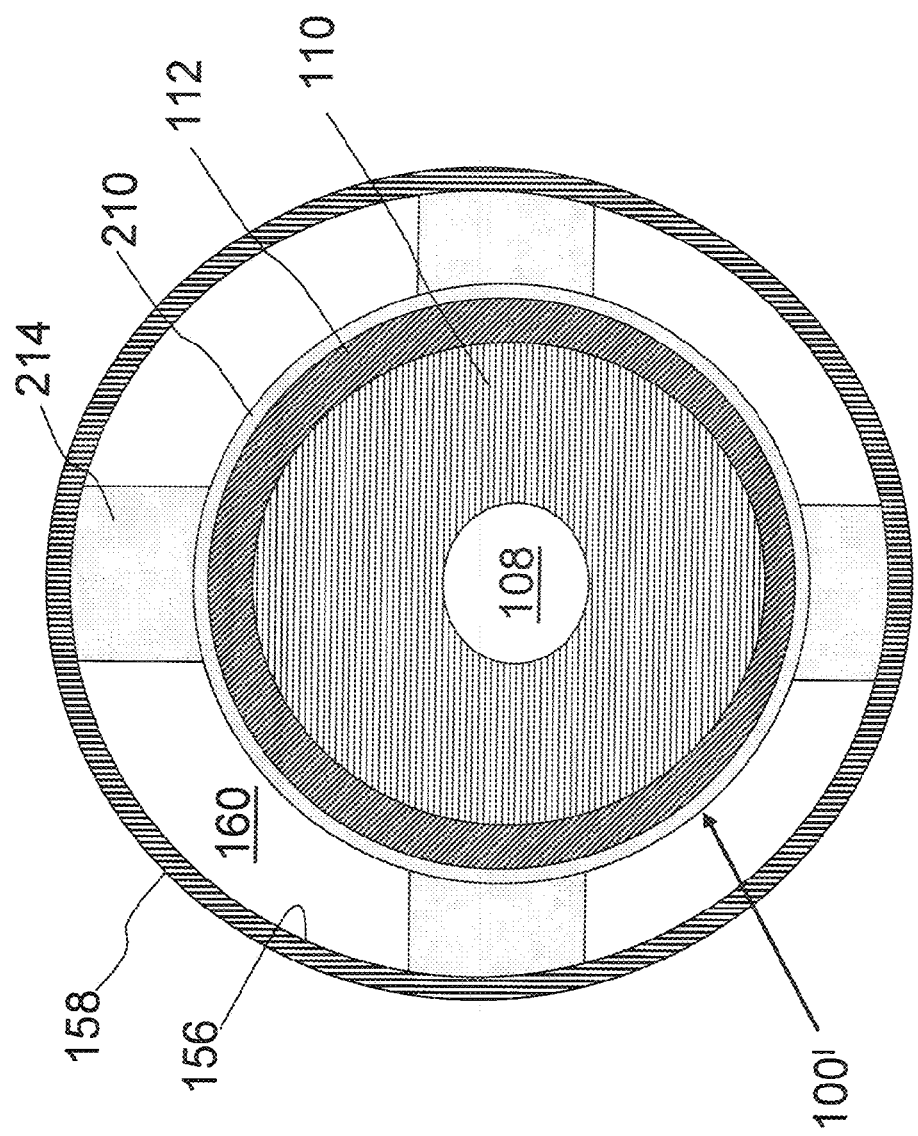
FIG. 5 cross-sectional view taken along line 5-5$^1$ of FIG. 4.

FIG. 4 shows the tabs 214 in an extended position and extending through the annular space 160 in contact with the inner surface 156 of the pressure housing 150. FIG. 5 depicts the cross-sectional area of the annular space 160 through which bypass flow is restricted by the tabs 214. For clarity, FIG. 5 only shows the next set of tabs 214 seen through the section of line $5-5^1$.

In operation, the inlet pipe 153 introduces a pressurized feedstock (not shown) at the upstream end 152 of the pressure housing 150. This creates a pressure gradient within the pressure housing 150 that drives the feedstock from the upstream end 152 towards the down stream end 154, along the longitudinal axis of the pressure housing 150. At least a portion of the pressurized feedstock enters the first spiral wound membrane element 100 at the upstream end 104. The portion of pressurized feedstock enters and travels through the feed spacer sheets of the spiral wound membrane element 100. A portion of the pressurized feedstock crosses the membrane sheet to form a permeate stream. The permeate stream flows through the permeate carrier sheets to be collected in the central tube 108. The remaining pressurized feedstock within the feed spacer sheets forms the retentate stream, which continues to flow through the feed spacer sheets and exits the first spiral wound membrane element 100 at the downstream end 106.

A portion of the retentate will enter the second spiral wound membrane element $100^1$ at the upstream end $104^1$. This portion of the retentate stream proceeds through the second spiral wound membrane element $100^1$ forming a second permeate stream and a second retentate stream. The second permeate stream is collected in the central tube 108. The second retentate stream exits the second spiral wound membrane element $100^1$ at the down stream end $106^1$ and at least a portion of the second retentate stream enters the third spiral wound membrane element $100^{11}$ at the upstream end $104^{11}$. The third spiral wound membrane element $100^{11}$ forms a third permeate stream and a third retentate stream. The first, second and third permeate streams are collected from the central tube 108 and the third retentate stream exits the down stream end $106^{11}$ and collected by the outlet pipe 155 at the downstream end 154 of the pressure housing 150.

A portion of the pressurized feedstock enters the annular space 160 at the upstream end 152 of the pressure housing 150 to provide bypass flow. Due to the orientation of the axial bypass sleeve 10, 210, 310 the bypass flow is restricted by the protrusion 14 or the tabs 214, 314. The restriction helps to maintain the pressure of the bypass flow through the annular space 160. With specific reference to the second and third axial bypass sleeves 210, 310 the bypass flow pushes, and holds, the tabs 214, 314 in the extended position. While in the extended position, a fluid path is created between the annular space 160, through the access ports 216, 316 and into the outer layer 116 of the spiral wound membrane element 100. Based upon the pressure gradient between the annular space 160 and the outer layer 116, a portion of the bypass flow will pass through the access ports 16, 216, 316 and enter the outer layer 116. When inside the outer layer 116, the bypass flow will enter the feed spacer sheets and flow into the mixed layer 110. This increases the flow rate and pressure within the feed spacer sheets through out the spiral wound membrane element 100, which increases the transmembrane pressure and contributes to increase the permeate production.

Along the longitudinal axis of the pressure housing 150, at or past the downstream end 106 of the spiral wound membrane element 100, the bypass flow that does not pass through the access ports 16, 216, 316 will mix with the retentate produced in the spiral wound membrane 100. A portion of this mixture will enter the spiral wound membrane element $100^1$ and a portion will enter the annular space 160 to create a bypass flow around the spiral wound membrane element $100^1$. This mixing of bypass flow and retentate flow will occur downstream of each spiral wound membrane element 100, $100^1$, $100^{11}$ within the pressure housing 150.

Optionally, the tabs 214, 316 can be in the extended position prior to loading the spiral wound membrane element 100 into the pressure housing 150. For example, the tabs 214, 314 may be opened to an approximate 45° angle relative to the planar body of the axial bypass sleeve 210, 310. Of particular interest to a horizontally oriented pressure housing 150, the tabs 214, 314 that are positioned on the bottom of the spiral wound membrane element 100 may elevate the spiral wound membrane element 100 off the lower inner surface 156 of the pressure housing 150. The elevation of the spiral wound membrane element 100 may ease the loading of the spiral wound membrane element 100.

The pressurized bypass flow may push the tabs 214, 314 into contact with the inner surface 158 of the pressure housing 150. This contact may assist in the centering of the spiral wound membrane element and cause a more even distribution of bypass flow around the entire circumference of the spiral wound membrane element 100, independent of the orientation of the pressure housing 150.

The range of movement through the extended position allows the tabs 214, 314 to accommodate dimensional differences between the outer diameter of various spiral wound membrane elements 100 and diameters of the inner surface 156 of various pressure housings 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A filtration apparatus comprising:
   A spiral wound membrane element with an outer surface;
   A tubular housing adapted to receive the spiral wound membrane element and defining an annular space between the outer surface and an inner surface of the tubular housing; and
   A bypass sleeve wrapped around the spiral wound membrane element, wherein the bypass sleeve has a protrusion that extends into the annular space and at least one opening that permits fluid communication from the annular space to the outer surface, said protrusion is a tab pivotally connected by at least one edge to the bypass sleeve, wherein said tab is moveable to contact the inner surface of the tubular housing.

2. The filtration apparatus of claim 1, wherein the protrusion is integral to the bypass sleeve.

3. The filtration apparatus of claim 1, wherein the protrusion is a region of increased thickness of the bypass sleeve.

4. The filtration apparatus of claim 1, comprising a plurality of tabs that are distributed with more tabs towards one end.

5. The filtration apparatus of claim 4, comprising a plurality of openings that are distributed with more openings towards the second end.

6. A method for filtering with a spiral wound membrane, comprising:
   a. inserting a spiral wound membrane element into a pressure housing and establish an annular space between the spiral wound membrane element and an inner surface of the pressure housing, the spiral wound membrane element having a bypass sleeve wrapped around said spiral wound membrane element, wherein the bypass sleeve has a protrusion that extends into the annular space and at least one opening that permits fluid communication from the annular space to the outer surface, said protrusion is a tab pivotally connected by at least one edge to the bypass sleeve, wherein said tab is moveable to contact the inner surface of the pressure housing;
   b. direct a pressurized feedstock through the pressure housing;
   c. filter the pressurized feedstock to produce a permeate stream and a retentate stream within the spiral wound membrane element;
   d. restrict the flow of pressurized feed stock through the annular space;

e. communicate a portion of the pressurized feedstock from the annular space into the spiral wound membrane; and
f. collect the permeate stream and retentate streams.

7. A filtration process, comprising:
a. providing a spiral wound filter within a pressure housing;
b. introducing a pressurized fluid into the housing;
c. splitting the pressurized fluid into a first flow that is filtered by the filter and a second flow that flows between the filter and the housing; and
d. diverting a portion of the second flow into the first flow by a bypass sleeve positioned around the filter, wherein the bypass sleeve has a protrusion and an opening, the protrusion extends towards the housing and the opening allows fluid communication with the filter, said protrusion is a tab pivotally connected by at least one edge to the bypass sleeve, wherein said tab is moveable to contact an inner surface of the pressure housing.

8. The filtration process of claim 7, wherein the protrusion modifies the pressure of the second flow.

9. The filtration process of claim 8, wherein the protrusion is integral with the sleeve.

10. The filtration process of claim 7, wherein the opening is upstream of the protrusion.

\* \* \* \* \*